(12) United States Patent
Moriyasu et al.

(10) Patent No.: US 7,658,504 B2
(45) Date of Patent: Feb. 9, 2010

(54) BACKLIGHT DEVICE AND DISPLAY DEVICE COMPRISING BACKLIGHT DEVICE

(75) Inventors: Mitsuhiro Moriyasu, Suzuka (JP); Toru Namiki, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 50 days.

(21) Appl. No.: 11/517,304

(22) Filed: Sep. 8, 2006

(65) Prior Publication Data

US 2007/0064171 A1 Mar. 22, 2007

(30) Foreign Application Priority Data

Sep. 16, 2005 (JP) ............................. 2005-271067

(51) Int. Cl.
*G09F 13/04* (2006.01)
*G09F 13/08* (2006.01)

(52) U.S. Cl. .................. 362/97.3; 362/612; 349/69

(58) Field of Classification Search .................. 257/99; 362/227, 249, 252, 612, 97.1–97.3; 349/69
See application file for complete search history.

(56) References Cited

U.S. PATENT DOCUMENTS

| | | |
|---|---|---|
| 6,789,921 B1 | 9/2004 | Deloy et al. |
| 7,275,852 B2 * | 10/2007 | Kim et al. .................. 362/612 |
| 2005/0088586 A1 | 4/2005 | Mori et al. |
| 2006/0146576 A1 | 7/2006 | Fukasawa et al. |

FOREIGN PATENT DOCUMENTS

| | | | |
|---|---|---|---|
| GB | 2 136 186 A | | 9/1984 |
| JP | 2002-72901 A | | 3/2002 |
| JP | 2002072901 A | * | 3/2002 |
| JP | 2004-139871 A | | 5/2004 |
| JP | 2004-139876 A | | 5/2004 |
| JP | 2005-44661 A | | 2/2005 |

* cited by examiner

*Primary Examiner*—Jason Moon Han
(74) *Attorney, Agent, or Firm*—Birch, Stewart, Kolasch & Birch, LLP

(57) ABSTRACT

In a backlight device according to the present invention including a light emitting diode substrate, which has a light emitting diode and is placed on the back side of a panel module having an image display surface on the front side, and a reflection sheet for reflecting light emitted by the light emitting diode to the panel module, the reflection sheet is placed on the front side of the light emitting diode substrate, and the reflection sheet is provided with a through-hole into which the light emitting diode is inserted, so as to reduce brightness unevenness and color unevenness on the image display surface resulting from the light emitting diode substrate.

8 Claims, 8 Drawing Sheets

BACKLIGHT DEVICE AND DISPLAY DEVICE COMPRISING BACKLIGHT DEVICE

CROSS-REFERENCE TO RELATED APPLICATIONS

This non-provisional application claims priority under 35 U.S.C. §119(a) on Patent Application No. 2005-271067 filed in Japan on Sep. 16, 2005, the entire contents of which are hereby incorporated by reference.

BACKGROUND OF THE INVENTION

1. Field of the Invention

The present invention relates to a backlight device for use as a light source of a liquid crystal display device, and a display device comprising the backlight device.

2. Description of Related Art

In a display device such as a television, a backlight device is placed on the back side of a panel module having an image display surface for displaying an image on the front side thereof.

As a backlight device, for example, there is a known backlight device comprising a light emitting diode substrate having light emitting diodes, and a reflection sheet for reflecting light emitted by the light emitting diodes to the panel module, wherein the light emitting diode substrate is placed between the reflection sheet and the panel module (see, for example, Japanese Patent Application Laid-Open No. 2004-139876).

BRIEF SUMMARY OF THE INVENTION

In the device of Japanese Patent Application Laid-Open No. 2004-139876, however, the figure of the light emitting diode substrate and the color of the light emitting diode substrate appear on the image display surface of the panel module, and cause brightness unevenness and color unevenness on the image display surface. Therefore, there has been a demand for measures to solve the problems.

The present invention has been made with the aim of solving the above problems, and it is a main object of the invention to provide a backlight device and a display device, capable of reducing brightness unevenness and color unevenness on the image display surface resulting from the light emitting diode substrate by placing a reflection sheet on the front side of the light emitting diode substrate and providing the reflection sheet with a through-hole into which the light emitting diode is inserted.

Another object of the invention is to provide a backlight device and a display device constructed to have a gap between the through-hole of the reflection sheet and the circumferential surface of the inserted light emitting diode at room temperature, and thereby capable of preventing the circumferential surface of the through-hole of the reflection sheet from coming into contact with the circumferential surface of the light emitting diode even when the reflection sheet thermally expands somewhat.

Still another object of the invention is to provide a backlight device and a display device, capable of correctly maintaining the positional relationship between the light emitting diode and through hole of the reflection sheet by comprising a housing for storing the reflection sheet and light emitting diode substrate and by fixing the light emitting diode substrate in a state in which it is arranged on the base wall of the housing.

Yet another object of the invention is to provide a backlight device and a display device in which the dimension of the gap varies depending on positions in the circumferential direction of the through-hole, thereby capable of reflecting light emitted from the light emitting diode by the reflection sheet without being influenced by the mount position of the light emitting diode substrate even when there is an irregularity in the positional relationship between the light emitting diode and the through-hole due to the mount position of the light emitting diode substrate.

A further object of the invention is to provide a backlight device and a display device in which the through-hole is either elliptical, rectangular, or oval in shape, thereby capable of reflecting light emitted from the light emitting diode by the reflection sheet without being influenced by the mount position of the light emitting diode substrate even when there is an irregularity in the positional relationship between the light emitting diode and the through-hole due to the mount position of the light emitting diode substrate.

A further object of the invention is to provide a backlight device and a display device in which at least one of the distances between adjacent light emitting diodes is different, and the though-hole of the reflection sheet is configured so that the gap between the through-hole and the circumferential surface of the light emitting diode has a longer dimension at a position in the circumferential direction where the distance is longer, and the gap between the through-hole and the circumferential surface of the light emitting diode has a shorter dimension at a position in the circumferential direction where the distance is shorter, thereby capable of preventing the circumferential surface of the through-hole from coming into contact with the circumferential surface of the light emitting diode due to thermal expansion of the reflection sheet.

A further object of the invention is to provide a backlight device and a display device constructed so that the dimension of the gap is longer in a long-side direction of the rectangular parallelepiped panel module than in the short-side direction, and thereby capable of making the number of the light emitting diodes in the long-side direction of the panel module less than the number of the light emitting diodes in the short-side direction, and capable of preventing the circumferential surface of the through-hole from coming into contact with the circumferential surface of the light emitting diode due to thermal expansion of the reflection sheet.

A backlight device and a display device according to the present invention comprises: a light emitting diode substrate with a light emitting diode mounted on the front side thereof, the light emitting diode substrate being placed on the back side of a panel module having an image display surface on the front side thereof, and a reflection sheet for reflecting light emitted by the light emitting diode to the panel module, and is characterized in that the reflection sheet is placed on the front side of the light emitting diode substrate and has through-hole into which the light emitting diode is inserted.

In this invention, since the reflection sheet having the through-hole into which the light emitting diode is inserted is placed on the front side of the light emitting diode substrate, it is possible to reduce brightness unevenness and color unevenness on the image display surface resulting from the light emitting diode substrate.

In the backlight device and display device according to the present invention, there is a gap between the through-hole and the circumferential surface of the inserted light emitting diode at room temperature.

In this invention, even when the reflection sheet thermally expands somewhat, it is possible to prevent the circumferential surface of the through-hole of the reflection sheet from coming into contact with the circumferential surface of the light emitting diode.

Further, the backlight device and display device according to the present invention comprises a housing for storing the reflection sheet and light emitting diode substrate, and fixing the light emitting diode substrate in a state in which the light emitting diode substrate is arranged on the base wall of the housing.

In this invention, since the light emitting diode substrate is fixed in a state in which it is arranged on the base wall of the housing, it is possible to correctly maintain the positional relationship between the light emitting diode and the through-hole of the reflection sheet, and it is possible to prevent the circumferential surface of the through-hole of the reflection sheet from coming into contact with the circumferential surface of the light emitting diode even when the reflection sheet thermally expands somewhat.

In the backlight device and display device according to the present invention, the dimension of the gap varies depending on positions in the circumferential direction of the through-hole.

In this invention, when a plurality of light emitting diode substrates are aligned and mounted, even if there is an irregularity in the positional relationship between the light emitting diodes and the through-holes due to the mount positions of the light emitting diode substrates, it is possible to reflect light emitted from the light emitting diodes by the reflection sheet without being influenced by the mount positions of the light emitting diode substrates.

In backlight device and display device according to the present invention, the through-hole is either elliptical, rectangular, or oval in shape.

In this invention, when a plurality of light emitting diode substrates are aligned and mounted, even if there is an irregularity in the positional relationship between the light emitting diodes and the through-holes due to the mount positions of the light emitting diode substrates, it is possible to reflect light emitted from the light emitting diode by the reflection sheet without being influenced by the mount positions of the light emitting diode substrates.

Further, the backlight device and display device according to the present invention comprises three or more of the light emitting diodes, wherein at least one of distances between adjacent light emitting diodes is different, and the through-hole is configured so that the gap between the through-hole and the circumferential surface of the light emitting diode has a longer dimension at a position in the circumferential direction where the distance is longer, and the gap between the through-hole and the circumferential surface of the light emitting diode has a shorter dimension at a position in the circumferential direction where the distance is shorter.

In this invention, when the reflection sheet thermally expands, the thermal expansion of the reflection sheet is larger at a position in the circumferential direction where the distance between the light emitting diodes is longer, and the thermal expansion of the reflection sheet is smaller at a position in the circumferential direction where the distance between the light emitting diodes is shorter. However, since the through-hole of the reflection sheet has a longer distance to the circumferential surface of the light emitting diode at a position in the circumferential direction where the distance is longer and has a shorter distance to the circumferential surface of the light emitting diode at a position in the circumferential direction where the distance is shorter, it is possible to prevent the circumferential surface of the through-hole from coming into contact with the circumferential surface of the light emitting diode due to thermal expansion of the reflection sheet.

The backlight device and display device according to the present invention are also characterized in that the dimension of the gap in a long-side direction of the panel module having a rectangular parallelepiped shape is longer than the dimension of the gap in a short-side direction.

In this invention, since the number of the light emitting diodes in the long-side direction of the panel module can be made less than the number of the light emitting diodes in the short-side direction, it is possible to decrease the weight, and it is also possible to prevent the circumferential surface of the through-hole from coming into contact with the circumferential surface of the light emitting diode due to thermal expansion of the reflection sheet.

As described in detail above, according to the present invention, since the reflection sheet having the through-hole into which the light emitting diode is inserted is placed on the front side of the light emitting diode substrate, it is possible to reduce brightness unevenness and color unevenness on the image display surface resulting from the light emitting diode substrate.

According to the present invention, even when the reflection sheet thermally expands somewhat, it is possible to prevent the circumferential surface of the through-hole of the reflection sheet from coming into contact with the circumferential surface of the light emitting diode.

According to the present invention, it is possible to correctly maintain the positional relationship between the light emitting diode and the through-hole of the reflection sheet, and it is possible to prevent the circumferential surface of the through-hole of the reflection sheet from coming into contact with the circumferential surface of the light emitting diode even when the reflection sheet thermally expands somewhat.

According to the present invention, it is possible to reflect light emitted from the light emitting diode by the reflection sheet without being influenced by the mount positions of a plurality of light emitting diode substrates.

According to the present invention, even when the reflection sheet thermally expands, it is possible to prevent the circumferential surface of the through-hole of the thermally expanded reflection sheet from coming into contact with the circumferential surface of the light emitting diode, and it is possible to prevent the reflection sheet from being creased.

According to the present invention, it is possible to make the number of the light emitting diodes in the long-side direction of the panel module less than the number of the light emitting diodes in the short-side direction and reduce the weight, and it is also possible to prevent the circumferential surface of the through-hole of the reflection sheet from coming into contact with the circumferential surface of the light emitting diode due to thermal expansion of the reflection sheet.

The above and further objects and features of the invention will more fully be apparent from the following detailed description with accompanying drawings.

DETAILED DESCRIPTION OF THE INVENTION

The following description will explain in detail the present invention, based on the drawings illustrating some embodiments thereof.

Embodiment 1

Figure 1:
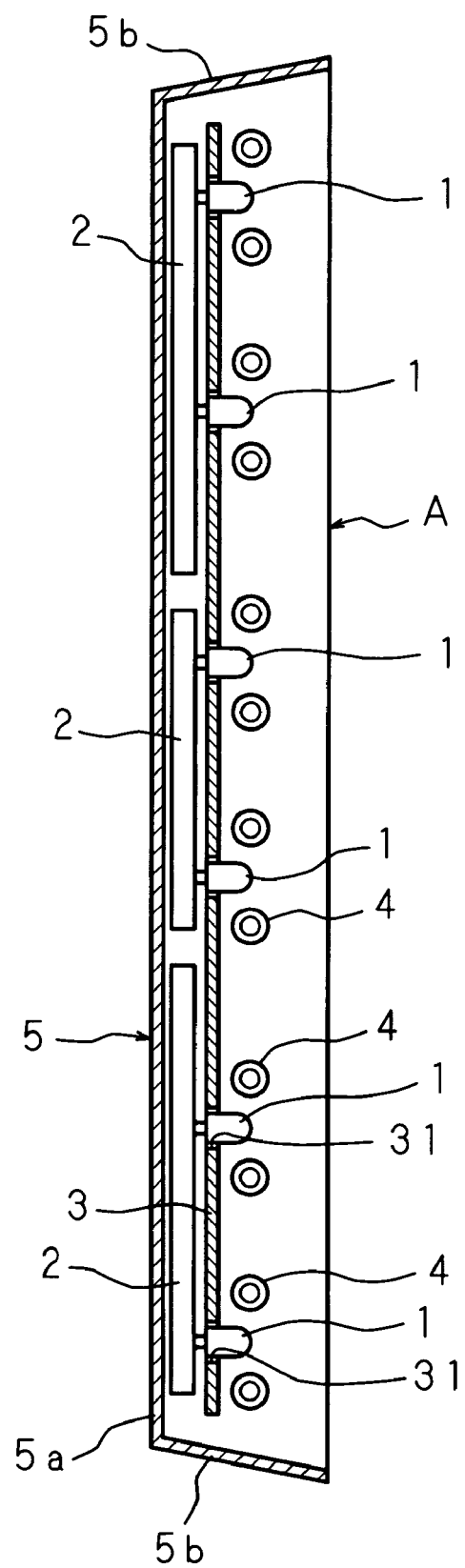
FIG. 1 is a schematic cross sectional view showing the structure of Embodiment 1 of a backlight device according to the present invention.
Figure 2:
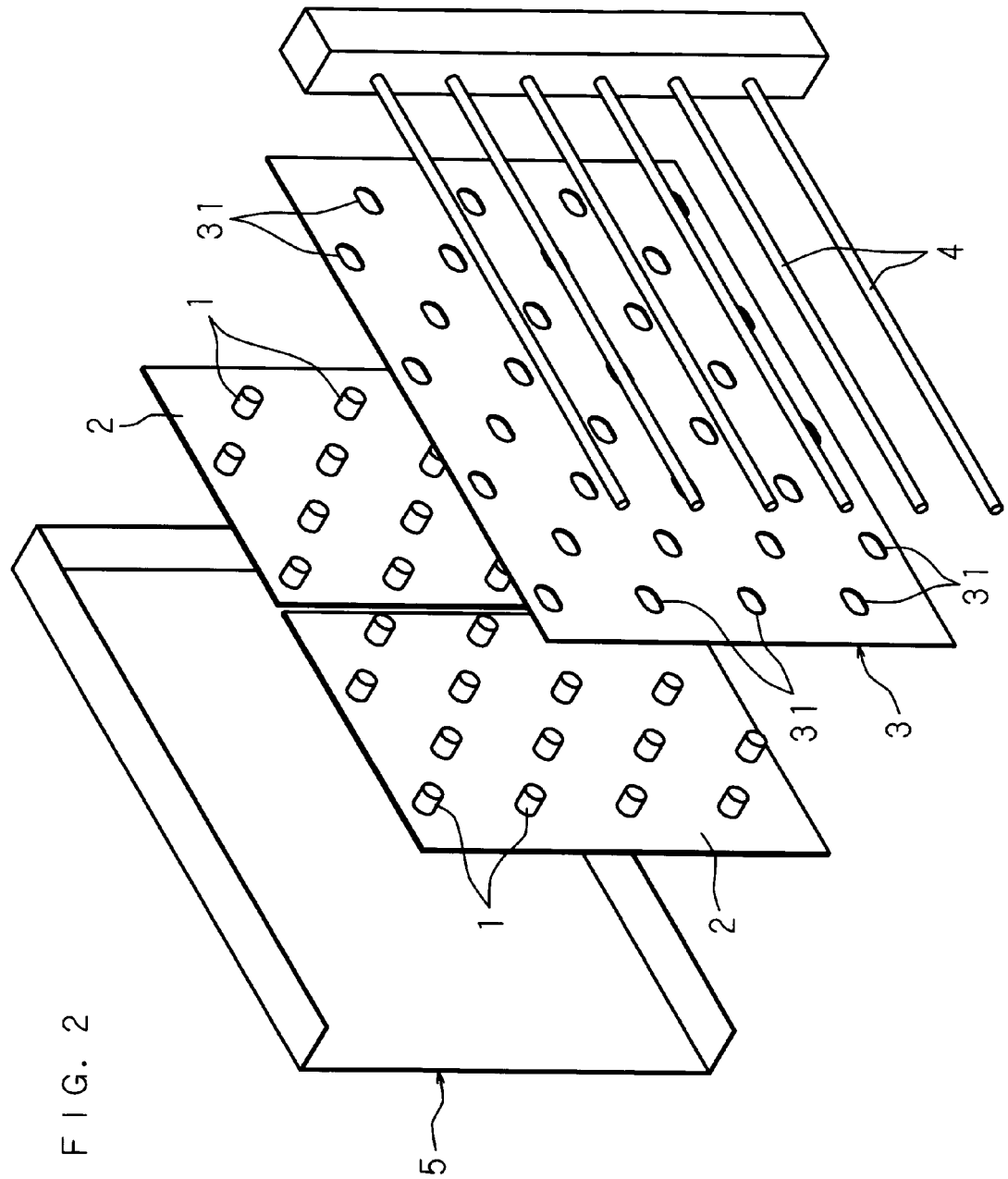
FIG. 2 is an exploded perspective view of the backlight device according to the present invention.
Figure 3:
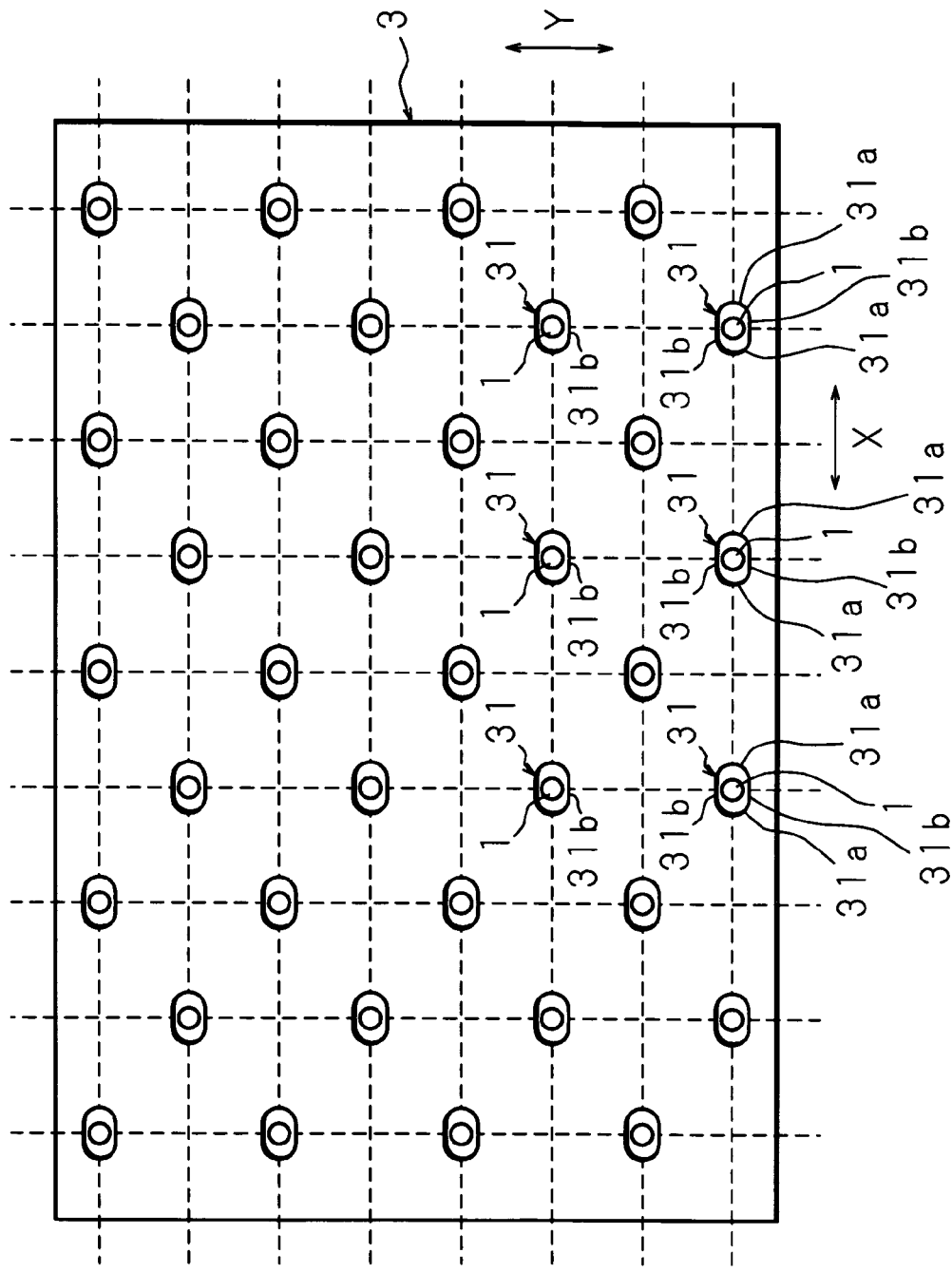
FIG. 3 is an explanatory view showing the relationship between light emitting diodes and through-holes of a reflection sheet of the backlight device according to the present invention.

FIG. 1 is a schematic cross sectional view showing the structure of Embodiment 1 of a backlight device according to the present invention, FIG. 2 is an exploded perspective view of the backlight device, and FIG. 3 is an explanatory view showing the relationship between light emitting diodes and through-holes of a reflection sheet.

A backlight device A illustrated in the drawings comprises a plurality of light emitting diode substrates 2 having three or more light emitting diodes 1 arranged with a distance therebetween in two orthogonal directions; a reflection sheet 3 placed on the light emitting diode 1 side of the light emitting diode substrates 2 and having through-holes 31 into which the light emitting diodes 1 are inserted; a plurality of cylindrical fluorescent tubes 4 aligned; and a housing 5 for storing and supporting the light emitting diode substrates 2, reflection sheet 3 and fluorescent tubes 4.

The housing 5 has a base wall 5a, and four side walls 5b joined to the edges of the base wall 5a. A plurality of light emitting diode substrates 2 are arranged on the inner side of the base wall 5a of the housing 5. Regarding the method of fixing the light emitting diode substrates 2, the positions of holes formed in the base wall 5a of the housing 5 and holes formed in the light emitting diode substrates 2 are aligned with each other, and the light emitting diode substrates 2 are fixed by inserting, into the holes, screws, or light source supporting members (lamp clips or the like) inserted from the front side of the base wall 5a to fix the fluorescent tubes 4.

In the case where the light emitting diode substrates 2 are fixed with lamp clips or the like, similar holes are also formed in the reflection sheet 3 placed between the light emitting diode substrates 2 and a liquid crystal panel (panel module), and the light emitting diode substrates 2 are positioned and fixed by the fastening function of the lamp clips in a state in which the light emitting diode substrates 2 are sandwiched between the reflection sheet 3 and the housing 5.

At this time, in order to prevent dust that may be generated by the fastening operation of the lamp clips or screws, the size of the holes formed in the light emitting diode substrates 2 is made larger than the sizes of the holes formed similarly in the housing 5 or the reflection sheet 3.

The light emitting diodes 1 of each light emitting diode substrate 2 are arranged with a distance therebetween in two orthogonal directions, and each of the light emitting diode 1 is substantially cylindrical with a spherical end. The separation distance between adjacent light emitting diodes 1 and 1 in one direction X is longer, and the separation distance between adjacent light emitting diodes 1 and 1 in the other direction Y is shorter.

The reflection sheet 3 is composed of one sheet of synthetic resin, and has thermal expansibility. Through-holes 31 of the reflection sheet 3 are arranged with a distance therebetween at positions corresponding to the light emitting diodes 1. In other words, the through-holes 31 are arranged with a distance therebetween in two orthogonal directions X and Y, and the separation distance between adjacent through-holes 31 and 31 in one direction X is longer than that in the other direction Y. Moreover, the reflection sheet 3 is supported on the light emitting diode substrates 2 so that the light emitting diodes 1 are inserted into substantially the center of the respective through-holes 31.

The through-hole 31 of the reflection sheet 3 is elliptical in shape, and the dimension of the gap between the through-hole 31 and the circumferential surface of the light emitting diode 1 at room temperature varies depending on positions in a circumferential direction of the through-hole 31, so that the through-hole 31 includes a long-dimension portion 31a and a short-dimension portion 31b. The long-dimension portion 31a is located at a position in the circumferential direction where the separation distance is longer, and the short-dimension portion 31b is located at a position in the circumferential direction where the separation distance is shorter.

The backlight device A constructed as described above is used as a light source for a liquid crystal display device.

Figure 4:
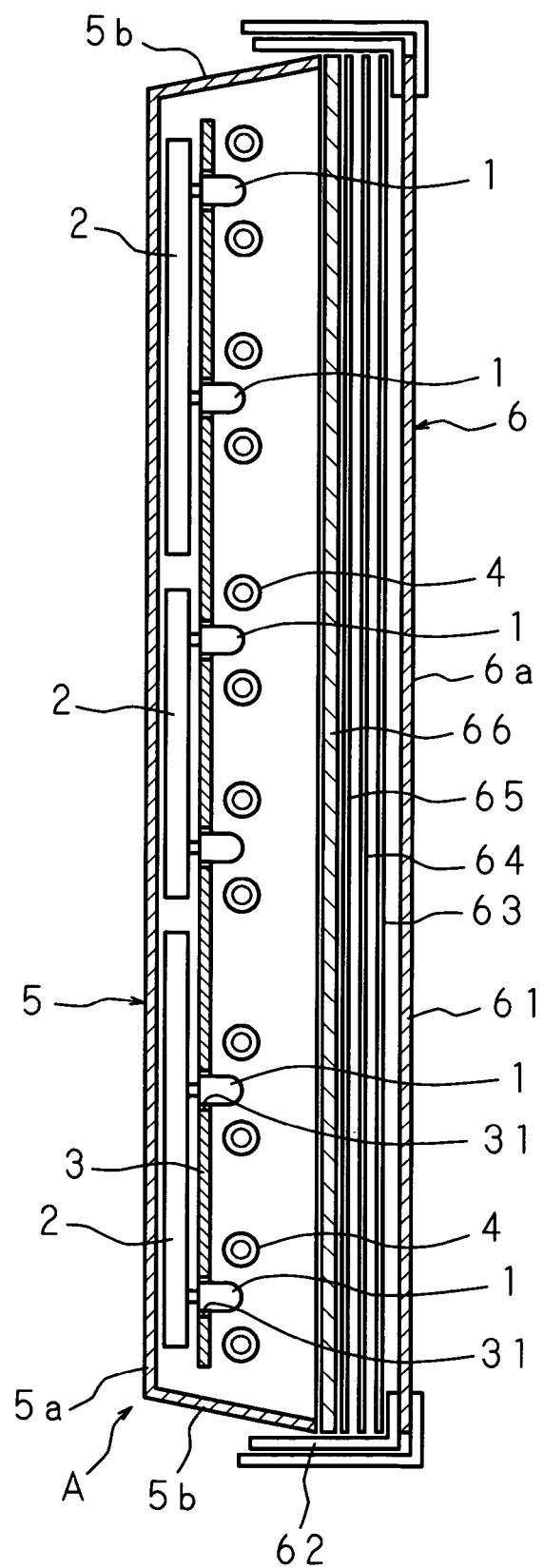
FIG. 4 is a schematic cross sectional view showing the structure of a display device according to the present invention.

FIG. 4 is a schematic cross sectional view showing the structure of a display device according to the present invention. This display device is a liquid crystal television, or, in other words, a liquid crystal display device, comprising a rectangular parallelepiped panel module 6 having an image display surface 6a for displaying television images on the front side, a backlight device A placed on the back side of the panel module 6, a quadrangular front cabinet surrounding the edges of the panel module 6, and a back cabinet for covering the backlight device A.

The panel module 6 comprises a rectangular parallelepiped panel body 61 having the image display surface 6a on the front side; a quadrangular holder frame 62 for holding the edges of the panel body 61; and optical sheets such as a reflection polarizing plate 63, a prism sheet 64, a diffusion sheet 65, and a diffusion plate 66 placed on the back side of the panel body 61. The housing 5 is attached to the holder frame 62.

In this liquid crystal display device, the through-holes 31 corresponding to the light emitting diodes 1 are formed in the reflection sheet 3, the light emitting diode substrates 2 are placed and fixed between the reflection sheet 3 and the base wall 5a of the housing 5, and the light emitting diodes 1 of the light emitting diode substrates 2 are inserted into the through-holes 31. It is therefore possible to eliminate brightness unevenness and color unevenness on the image display surface 6a resulting from the light emitting diode substrates 2.

Moreover, since the reflection sheet 3 has thermal expansibility, it thermally expands with heat generated by the light emitting diodes 1, fluorescent tubes 4 and panel body 61. However, the through-holes 31 formed in the reflection sheet 3 are elliptical in shape, and the long-dimension portion 31a is located at a position in the circumferential direction where the separation distance is longer (in one direction X, or, in other words, the long-side direction of the panel module), and the short-dimension portion 31b is located at a position in the circumferential direction where the separation distance is shorter (in the other direction Y, or, in other words, the short-side direction of the panel module). Therefore, even when the reflection sheet 3 expands thermally, it is possible to prevent the circumferential surface of the through-hole 31 of the reflection sheet 3 from coming into contact with the circumferential surface of the light emitting diode 1.

When the reflection sheet 3 expands thermally, the thermal expansion in a portion where the separation distance between the through-holes 31 and 31 is longer is larger than the thermal expansion in a portion where the separation distance between the through-holes 31 and 31 is shorter. Therefore, for example, when the light emitting diode 1 is not inserted into the center of a through-hole 31 and the light emitting diode 1 is displaced from the center of the through-hole 31 because of positions where a plurality of light emitting diode substrates 2 are arranged, if the through-hole 31 is completely round in shape, the circumferential surface of the through-hole 31 into which the displaced light emitting diode 1 is inserted comes into contact with the circumferential surface of the displaced light emitting diode 1, and a reaction force caused by this contact is applied to the reflection sheet 3, and creases appear on the reflection sheet 3. However, the through-hole 31 of the reflection sheet 3 includes the long-dimension portion 31a and the short-dimension portion 31b with respect to the circumferential surface of the light emitting diode 1, and the long-dimension portion 31a is located at a position in the circumferential direction where the separation distance is longer (in one direction X) and the short-dimension portion 31b is located at a position in the circumferential direction where the separation distance is shorter (in the other direction Y). Therefore, even when the light emitting diode 1 is displaced from the center of the through-hole 31, it is possible to prevent the circumferential surface of the through-hole 31 from coming into contact with the circumferential surface of the displaced light emitting diode 1. Thus, the circumference of the through-hole 31 of the reflection sheet 3 will never interfere with irradiation of the panel module with light emitted by the light emitting diode 1. Note that if the through-hole is completely round in shape and the dimension between the circumferential surface of the through-hole and the circumferential surface of the light emitting diode 1 is relatively large, there is a large empty space in the through-hole, and the light reflection efficiency is poor.

Moreover, the through-hole 31 is elliptical in shape, and the circumferential surface in the long-dimension portion 31a is a circular arc surface corresponding to the circumferential surface of the substantially cylindrical light emitting diode 1. Therefore, even when the circumferential surface of the through-hole 31 comes into contact with the light emitting diode 1, creases will hardly appear on the reflection sheet 3.

Embodiment 2

Figure 5:
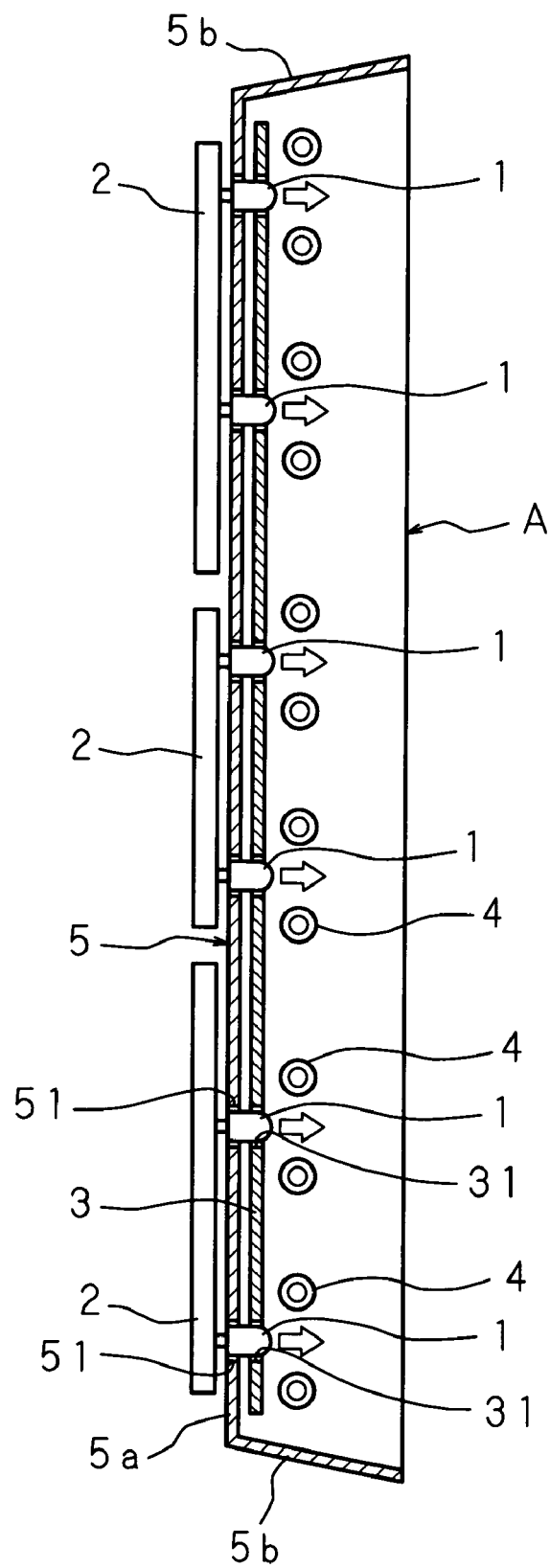
FIG. 5 is a schematic cross sectional view showing the structure of Embodiment 2 of a backlight device according to the present invention.
Figure 6:
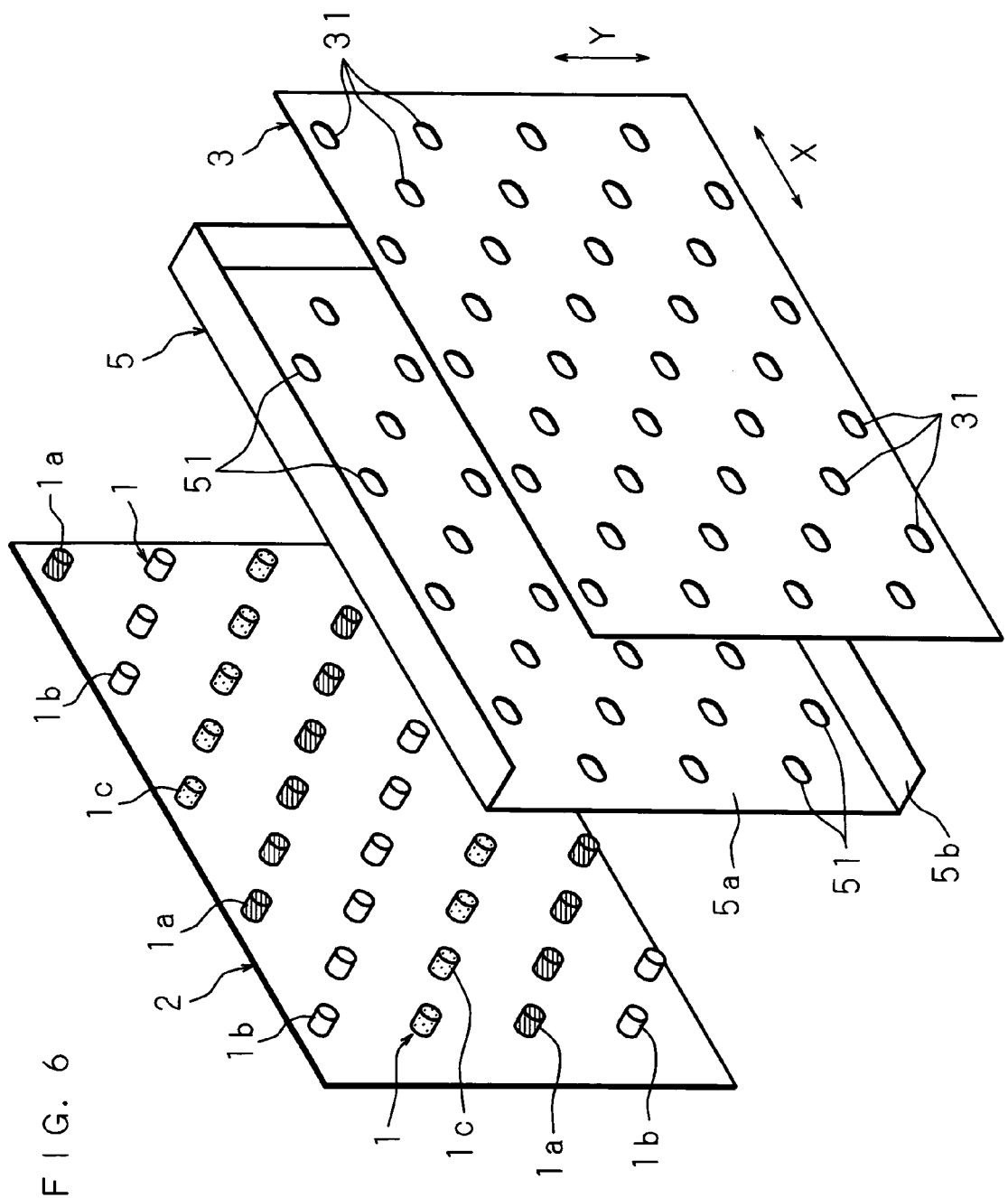
FIG. 6 is an exploded perspective view of the backlight device according to the present invention.
Figure 7:
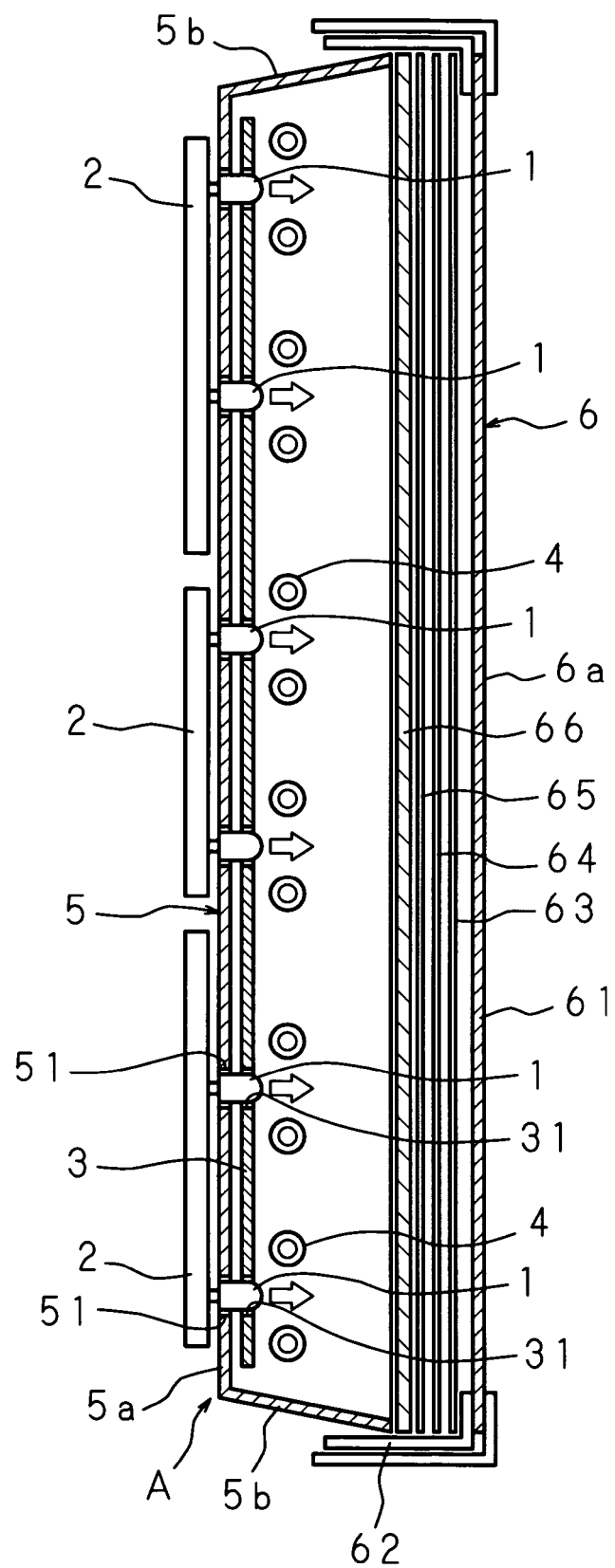
FIG. 7 is a schematic cross sectional view showing another structure of a display device according to the present invention.

FIG. 5 is a schematic cross sectional view showing the structure of Embodiment 2 of a backlight device according to the present invention, FIG. 6 is an exploded perspective view of the backlight device, and FIG. 7 is a schematic cross sectional view showing another structure of a display device according to the present invention. In this backlight device, instead of arranging a plurality of light emitting diode substrates 2 in the housing 5, the light emitting diode substrate 2 are arranged outside the base wall 5a of the housing 5; insertion holes 51 corresponding to the light emitting diodes 1 of the light emitting diode substrates 2 are formed in the base wall 5a of the housing 5; and the reflection sheet 3 of Embodiment 1 is supported on the inner side of the base wall 5a of the housing 5 formed using a metal material.

The light emitting diodes 1 of each light emitting diode substrate 2 include first elements 1a for emitting red light, second elements 1b for emitting blue light, and third elements 1c for emitting green light, which are arranged one after the other with a distance therebetween in two orthogonal directions. Each light emitting diode 1 is substantially cylindrical with a spherical end. The separation distance between adjacent light emitting diodes 1 and 1 in one direction X is longer, and the separation distance between adjacent light emitting diodes 1 and 1 in the other direction Y is shorter.

Since the housing 5 is formed using a metal material having a lower thermal expansibility than synthetic resin materials, the insertion hole 51 may have a circular shape, but, in FIG. 6, it has an elliptical shape corresponding to the through-hole 31.

In Embodiment 2, since the light emitting diode substrates 2 are positioned outside the housing 5, it is possible to improve the performance of radiating heat generated by the light emitting diode substrates 2, and it is possible to easily attach the light emitting diode substrates 2 to the correct position, or easily detach the light emitting diode substrates 2.

Since other structures and functions are the same as in Embodiment 1, similar parts are designated with the same codes, and the detailed explanation and the explanation of the functions and effects are omitted.

Embodiment 3

Figure 8:
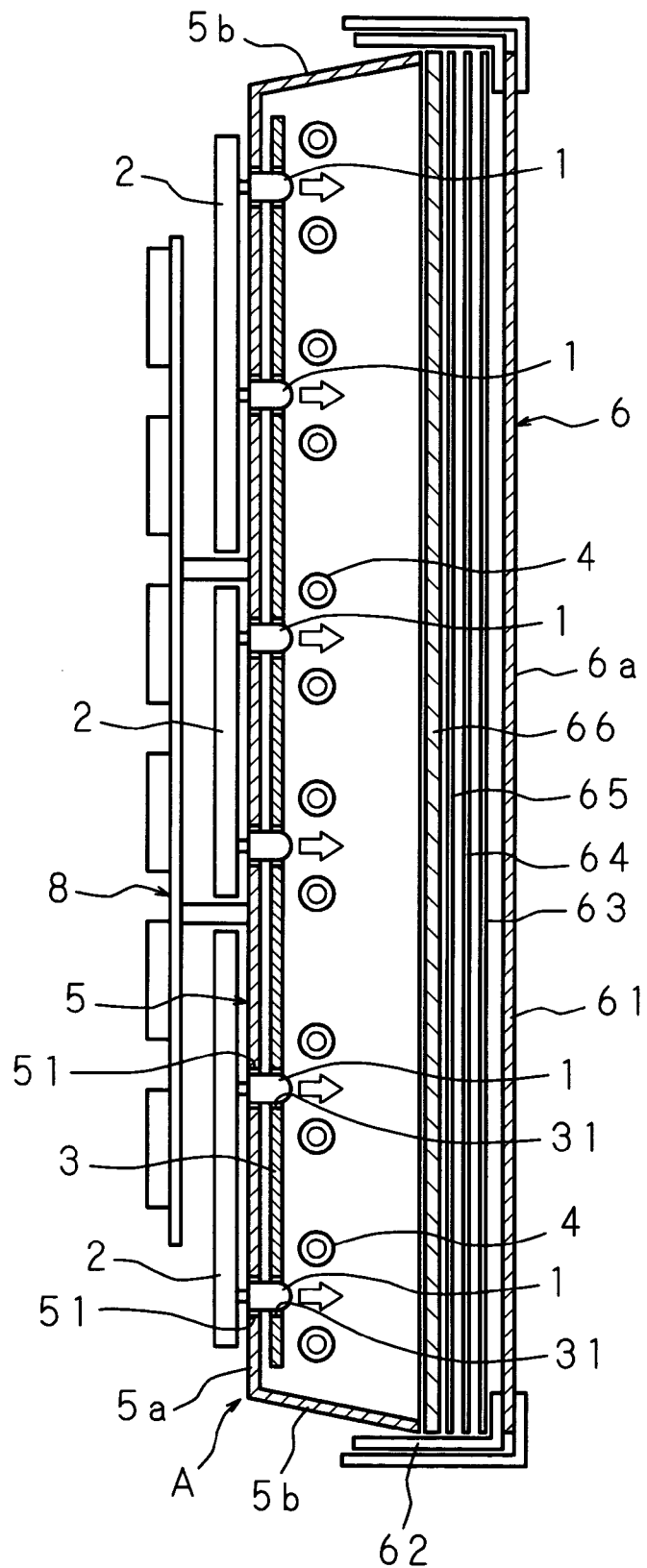
FIG. 8 is a schematic cross sectional view showing another structure of the backlight device according to the present invention, and the structure of a display device comprising this backlight device.

FIG. 8 is a schematic cross sectional view showing another structure of the backlight device according to the present invention, and the structure of a display device comprising this backlight device. In this backlight device, an inverter circuit substrate 8 is provided outside the light emitting diode substrates 2 of Embodiment 2, and the inverter circuit substrate 8 is supported on the base wall 5a of the housing 5.

Since other structures and functions are the same as in Embodiments 1 and 2, similar parts are designated with the same codes, and the detailed explanation and the explanation of the functions and effects are omitted.

Although the embodiments described above illustrate the structures including the fluorescent tubes 4, it may be possible to construct the present invention without the fluorescent tubes 4.

Moreover, in the embodiments described above, the through-holes are elliptical in shape, but the through-holes may be rectangular or substantially oval in shape.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A backlight device comprising:
a light emitting diode substrate with a plurality of light emitting diodes mounted on a front side thereof, the light emitting diode substrate being placed on a back side of a panel module having a rectangular shape, and having an image display surface on a front side thereof; and
a reflection sheet for reflecting light emitted by said light emitting diodes to said panel module, being placed on the front side of said light emitting diode substrate and having a plurality of though-holes arranged with at least one of a distance therebetween in two orthogonal directions and in a staggered array, only a single light emitting diode being inserted in each of the plurality of through-holes, wherein gaps between said through-holes in a long-side direction of said panel module and the light emitting diodes inserted into said through-holes being larger than gaps between said through-holes in a short-side direction of said panel module and the light emitting diodes inserted into said through-holes, respectively, to prevent said only a single light emitting diode from making contact with a surface defining a through-hole due to a thermal expansion of said reflection sheet.

2. The backlight device according to claim 1, wherein each of the through-holes is either elliptical, rectangular, or oval in shape.

3. The backlight device according to claim 1, further comprising:

a housing for storing said reflection sheet and a plurality of said light emitting diode substrates, wherein said light emitting diode substrates are fixed in a state in which said light emitting diode substrates are arranged on a base wall of said housing.

4. The backlight device according to claim 1, wherein a cross section of said light emitting diode is circular in shape.

5. A display device comprising:

the backlight device defined in claim 1 and placed on the back side of said panel module, and the panel module having the image display surface on the front side thereof.

6. A display device comprising:

the backlight device defined in claim 4 and placed on the back side of said panel module, and the panel module having the image display surface on the front side thereof.

7. A display device comprising:

the backlight device defined in claim 3 and placed on the back side of said panel module, and the panel module having the image display surface on the front side thereof.

8. A display device comprising:

the backlight device defined in claim 4 and placed on the back side of said panel module, and the panel module having the image display surface on the front side thereof.

* * * * *